F. E. CHAPMAN.
PIPE REST.
APPLICATION FILED DEC. 26, 1919.
1,398,223.
Patented Nov. 29, 1921.
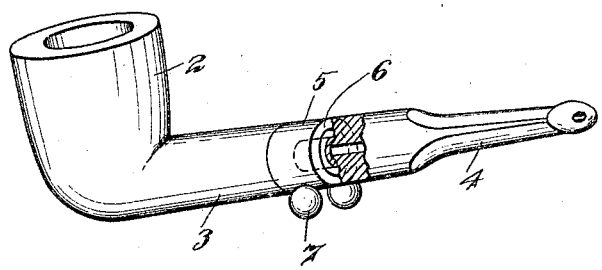
Inventor
Frederick E. Chapman
By Arthur Jenkins,
Attorney

UNITED STATES PATENT OFFICE.

FREDERICK E. CHAPMAN, OF MIDDLETOWN, CONNECTICUT.

PIPE-REST.

1,398,223.  Specification of Letters Patent.  Patented Nov. 29, 1921.

Application filed December 26, 1919. Serial No. 347,307.

*To all whom it may concern:*

Be it known that I, FREDERICK E. CHAPMAN, a citizen of the United States, and a resident of Middletown, in the county of Middlesex and State of Connecticut, have invented a new and Improved Pipe-Rest, of which the following is a specification.

My invention relates to the class of devices employed for supporting a pipe in an upright position, and an object of my invention, among others, is to provide a device of this class that shall be extremely simple in its construction, that will require little expense to produce, and that will be extremely neat in appearance.

One form of rest embodying my invention and in the construction and use of which the objects herein set out, as well as others, may be attained, is illustrated in the accompanying drawings, in which—

The figure is a perspective view of a pipe supplied with my improved pipe rest.

In the accompanying drawings the numeral 2 indicates the bowl of a pipe, 3 the stem, and 4 the bit, all of which parts may be of the usual form and constructed of any suitable material. A ferrule 5 is shaped to fit upon the end of the stem 3, such ferrule having a flange 6 to partially overlie the end of the stem and between it and the bit. In carrying my invention into effect I provide this ferrule with a rest that comprises substantially an integral part of the ferrule. Such rest may be constructed in various ways, and in the preferred form, as shown herein, there are two members located upon opposite sides of a plane passing diametrically through the stem lengthwise of the bowl at its center, and these members are preferably formed in the shape of balls 7. These balls may be secured in any suitable manner to the ferrule to form practically an integral part thereof and such rests are so formed as not to be objectionable in materially increasing the size of the pipe at the ferrule or in constituting projections of an objectionable nature.

In accordance with the provisions of the patent statutes, I have described the principles of operation of my invention, together with the device which I now consider to represent the best embodiment thereof; but I desire to have it understood that the device shown is only illustrative, and that the invention may be carried out by other means.

I claim—

A pipe including a ferrule having two rests of substantially spherical form and comprising substantially an integral part of said ferrule, the curves of said rests merging directly with the curve of the ferrule, thereby forming an acute angle at the meeting points of the two surfaces.

FREDERICK E. CHAPMAN.